US008356851B2

(12) United States Patent
Lange

(10) Patent No.: US 8,356,851 B2
(45) Date of Patent: Jan. 22, 2013

(54) MULTICOMPONENT DECORATIVE SCREEN FOR A MOTOR VEHICLE AND METHOD FOR THE INSTALLATION THEREOF

(75) Inventor: Marcus Lange, Pfungstadt (DE)

(73) Assignee: GM Global Technology Operations LLC, Detroit, MI (US)

( * ) Notice: Subject to any disclaimer, the term of this patent is extended or adjusted under 35 U.S.C. 154(b) by 366 days.

(21) Appl. No.: 12/760,235

(22) Filed: Apr. 14, 2010

(65) Prior Publication Data

US 2010/0294442 A1 Nov. 25, 2010

(30) Foreign Application Priority Data

Apr. 14, 2009 (DE) .......................... 10 2009 017 384

(51) Int. Cl.
B60J 1/08 (2006.01)
(52) U.S. Cl. ..................................... 296/1.08; 296/146.2
(58) Field of Classification Search ............. 296/146.15, 296/96.11, 1.08, 146.2
See application file for complete search history.

(56) References Cited

U.S. PATENT DOCUMENTS

2004/0178661 A1* 9/2004 Filipczak et al. .......... 296/181.1
2010/0327622 A1* 12/2010 Lauderlein et al. ...... 296/146.15
2011/0006556 A1* 1/2011 Lange et al. ................. 296/1.08
2011/0163563 A1* 7/2011 Yanai .......................... 296/1.08

FOREIGN PATENT DOCUMENTS

| DE | 2018864 A1 | 11/1971 |
| DE | 29902938 U1 | 5/1999 |
| DE | 202007005719 U1 | 8/2007 |
| WO | 2007128519 A1 | 11/2007 |

* cited by examiner

Primary Examiner — Jason S Morrow
(74) Attorney, Agent, or Firm — Ingrassia Fisher & Lorenz, P.C.

(57) ABSTRACT

A decorative screen configuration is provided for fastening on a motor vehicle body having a first decorative screen profile and a second decorative screen profile, which are each fastenable on the vehicle body using an end section adjoining one another in the profile longitudinal direction, the first decorative screen profile having a fastening extension protruding in the profile longitudinal direction from its end section, which is positively and/or nonpositively connectable to the end section of the second screen profile. Furthermore, decorative screen and an associated installation method are provided in which the decorative screen is fixed using detent and counter detent element in a pre-installation position on the vehicle body and can be transferred by a pivot movement into a final installation position on the vehicle body.

20 Claims, 4 Drawing Sheets

MULTICOMPONENT DECORATIVE SCREEN FOR A MOTOR VEHICLE AND METHOD FOR THE INSTALLATION THEREOF

CROSS-REFERENCE TO RELATED APPLICATION

This application claims priority to German Patent Application No. 102009017384.6, filed Apr. 14, 2009, which is incorporated herein by reference in its entirety.

TECHNICAL FIELD

The present invention relates to a decorative screen configuration for fastening on the vehicle body of a motor vehicle and a corresponding installation method.

BACKGROUND

Decorative screens and decorative screen configurations have manifold applications in the automotive field. They are to be situated in greatly varying embodiments, preferably on the externally visible outer side of the motor vehicle body, for example, in the area of A, B, or C columns, especially in the edge area of window openings of the vehicle body. A decorative screen is to have, in addition to the highest-quality visual and haptic appearance possible, only a small space requirement for transportation purposes. Furthermore, such screens are to be producible cost-effectively and are to be installable on the vehicle body as simply and reliably as possible.

For example, a seal profile for sealing a moving windowpane of a motor vehicle door, which has an elastic main body, is known from WO 2007/128519 A1. This main body has a decorative screen area which can be positioned toward the motor vehicle outer side having a material recess, a slot for installing a decorative molding in a clamp seat being provided above and/or below the material recess.

An installation concept of this type does allow the fastening of a decorative screen on a motor vehicle body without the aid of adhesive components. However, for example, if a window cutout of a vehicle body is to be disguised at least regionally or even completely using a decorative molding, this sometimes proves to be difficult because of the predetermined geometry of the window opening. Depending on the design specifications, for example, it can be necessary that a decorative screen in the area of a C column, for example, in particular in the transition area between C column and an upper boundary of a window shaft of the vehicle body adjoining it, has a comparatively wide cross-sectional profile and a shape which is strongly bent or curved overall.

A decorative screen to be situated in the vehicle longitudinal direction (x) in the area of the upper window shaft boundary, in contrast, typically has a smaller cross-sectional area. Accordingly, it proves expedient for production to manufacture the decorative screen sections, which are to be implemented differently in cross-section, separately and each using a production method suitable for this purpose. For example, a window shaft molding can be implemented as an extruded profile, while a decorative screen which is to be situated in the area of the C column and is to be implemented comparatively wide in cross-section is to be manufactured as a die cast component because of its curved or arched shaping and optionally because of its comparatively large cross-sectional area.

The present invention is thus based on at least one object of connecting different decorative screen profiles or decorative screen sections which adjoin one another in the profile longitudinal direction precisely to one another in a simple way. In addition, a simplified installation of a decorative screen configuration is provided on the motor vehicle body. The transition area between the individual decorative screen profiles to be connected to one another is thus to be implemented as particularly elegant, in particular free of gaps, offset, and play. Furthermore, other objects, desirable features, and characteristics will become apparent from the subsequent summary, detailed description, and the appended claims, taken in conjunction with the accompanying drawings and this background.

SUMMARY

The decorative screen configuration according to an embodiment of the invention is provided for fastening on a motor vehicle body, in particular for fastening on a window opening boundary. The decorative screen configuration has a first and a second decorative screen profile, which are each connectable to one another having an end section adjoining one another in the profile longitudinal direction in the installation position on the motor vehicle body and are each fastenable on the vehicle body.

For the mutual fastening of the two decorative screen profiles or decorative screen profile sections, the first decorative screen profile has a fastening extension, which protrudes from its end section facing toward the second profile in the profile longitudinal direction, and which is connectable positively and/or nonpositively to the end section of the second screen profile, which faces toward the first screen profile.

Using the fastening extension, a connection of two decorative screen profiles adjoining one another in the profile longitudinal direction with one another can be provided, so that a corresponding decorative screen configuration having at least two decorative screen profiles can already be manufactured preinstalled and/or preconfigured by a motor vehicle supplier and can be fastened in a simple and time-saving way to the vehicle body in the mass production of an automobile producer. This is because instead of a separate fastening in each case of a plurality of decorative screen profiles or decorative screen profile sections on the vehicle body, according to the embodiment of the invention, the fastening of one decorative screen comprising multiple components and/or sections is provided.

Furthermore, the connection of two decorative screen profiles with one another to be implemented using the fastening extension allows a transition without play, offset, or gap of the two decorative screen profiles, which are producible separately using suitable and different production methods for this purpose in each case, for example. A transition without play, offset, or gap of this type considers the demands placed on the decorative screen configuration from an aesthetic and design aspect.

According to a first advantageous embodiment of the invention, the fastening extension is implemented as an integral component of a carrier connected to the first screen profile. While the actual externally visible screen profile can be implemented as a metal part, for example, as an aluminum extruded part or as a rolled stainless steel part, the carrier is preferably manufactured from a plastic, which is connected to the first screen profile using an injection-molding process. At least the first decorative screen profile thus preferably has an externally visible metal screen part and a carrier part manufactured from plastic.

According to a further embodiment, the second decorative screen profile has a receptacle for the fastening extension of the first decorative screen profile, the receptacle being implemented as C-shaped or U-shaped in cross-section and laterally enclosing the fastening extension of the first decorative screen profile in the installation position, i.e., upon a connection of the two decorative screen profiles with one another and/or a fastening of both profiles on the vehicle body. In particular, upon achieving the installation position, the preferably metal screen part of the first decorative screen profile adjoins the second decorative screen profile, which is preferably also manufactured from metal or has a comparable metal screen part, without a gap, offset, or play.

Furthermore, the externally visible adjoining end sections of the first and second decorative screen profiles can be implemented as running essentially perpendicularly to the profile longitudinal direction. However, edge geometries deviating there from, such as inclined shapes corresponding to one another, are also within the scope of the invention.

To form a positive connection of both decorative screen profiles with one another, according to a further embodiment of the invention, the second decorative screen profile has at least one recess for a detent element implemented on the fastening extension of the first decorative screen profile on its end section receiving the fastening extension of the first profile, and/or in the area of its receptacle, internally, i.e., facing toward the vehicle body in the final installation position on the motor vehicle. The recess is preferably implemented in an edge section of the second screen profile, for example, in a lateral leg of the C-shaped or U-shaped receptacle of the second profile directly adjoining the vehicle body.

Correspondingly, it is provided that the detent element implemented on the fastening extension and corresponding to the recess is implemented as a detent lug which is movable transversely to the profile longitudinal extension and is preferably flexibly deformable, and which, because of its elasticity or spring action, is firstly transferred into an inwardly directed, at least slightly bent configuration upon joining of the two decorative screen profiles, and finally comes to rest in the edge-side recess of the second screen profile, which represents a counter detent for the detent lug, because of its bias tension and thus holds the two decorative screen profiles together captively.

A fundamentally sufficient connection of both decorative screen profiles with one another can already be provided using the detent lug implemented on the fastening extension by simple joining of the two decorative screen profiles without the aid of further connectors or tools.

Independently or in combination with the positive connection of the two decorative screen profiles, according to a further embodiment of the invention, the fastening extension of the first decorative screen profile can be glued to the receptacle implemented as corresponding thereto on the second decorative screen profile. For example, before, during, or after the joining of the two decorative screen profiles, an adhesive or a corresponding adhesively implemented layer can be provided in the area of the decorative screen profiles, which are situated overlapping transversely to the profile longitudinal extension, and the fastening extension. An additional connection of the two screen profiles which optionally reinforces the already existing form fit can be provided by the use of an adhesive to form a nonpositive connection of the two decorative screen profiles.

According to a further advantageous embodiment of the invention, a detent element to form a detent connection with a counter detent element situated on the vehicle body side is provided on the first profile, preferably on its carrier, on the side facing toward the vehicle body. Using this detent connection, the entire decorative screen configuration can be held in the pre-installation position on the vehicle body. The detent connection is implemented so that it fixes the carrier of the first decorative screen profile, preferably the entire decorative screen configuration, on the vehicle body at least with respect to the vehicle transverse direction (y) and/or in relation to the vehicle longitudinal direction (x).

Furthermore, the detent connection is implemented for the purpose of allowing a compensation movement of the carrier, and/or the entire decorative screen configuration, relative to the vehicle body, essentially along the vehicle vertical axis (z) i.e., using the detent connection, a pre-installation position can be assumed, which allows a precisely-fitted adjustment and subsequent fastening of the decorative screen configuration in the provided final installation position on the vehicle body.

Using the pre-installation position provided via the detent connection, the installation process of the decorative screen configuration on the vehicle body is simplified. According to a further advantageous implementation of the invention, the carrier, preferably the entire decorative screen configuration, is linked on the vehicle body so it is pivotable by at least approximately 8°, preferably by approximately 10°, using the detent connection formed by detent element and counter detent element.

The pivot axis of this pivot movement preferably extends essentially in the vehicle transverse direction (y). It can preferably be coincident with the position of the detent element and/or the counter detent element. The detent element not only allows a linear, translational relative movement of decorative screen configuration and vehicle body, but rather also a pivot movement within certain limits.

According to a further advantageous embodiment, the detent element is implemented as a clip provided with two elastically deformable legs, which can be clipped into the corresponding counter detent element, which is provided with retention webs oriented essentially parallel to one another, and is situated on the vehicle body side. A reverse configuration of detent element and counter detent element is also conceivable, according to which the detent element implemented as a clip is situated on the vehicle body side and the counter detent element is situated on the decorative screen.

The legs of the detent element are preferably oriented parallel to one another and preferably have a greater extension in the vehicle vertical direction (z) than in the vehicle longitudinal direction (x). Upon insertion of the clip provided on the decorative screen side into the corresponding counter detent element, the two legs of the clips situated spaced apart from one another move toward one another under the action of the counter detent element and return back nearly into their original configuration upon reaching a pre-installation position, which is characterized by an engagement of detent element and counter detent element.

Because the detent element has an overall rectangular or oval geometry and is preferably integrally connected to the carrier of the first decorative screen profile, the pivoting capability, which is provided within predetermined limits, of the decorative screen configuration in relation to the vehicle body can already be provided solely by elastic deformation of the detent element and/or counter detent element.

According to a further advantageous embodiment, the detent element and the counter detent element further have insertion bevels corresponding to one another and adjoining undercuts. The insertion bevels of detent element and counter detent element are faced toward one another before the installation of the decorative screen configuration on the vehicle body, so that when the decorative screen configuration is pushed on in the direction of the vehicle longitudinal direction (y), the legs and/or the retention webs of detent element and counter detent element execute a yielding movement, which finally has the result that the detent and counter detent elements corresponding to one another press against one another using their undercuts upon reaching the pre-installation position of the decorative screen configuration.

According to a further advantageous embodiment of the invention, the first decorative screen profile particularly has a bent or regionally curved shape and can be situated in the transition area of C column and an upper boundary of the window shaft. For example, this first decorative screen profile can also have a curvature exceeding approximately 90°, so that an inner angle between C column section and window shaft section can be formed in the range of approximately 75°, 60°, 50°, or less.

Furthermore, according to a further independent aspect of the invention, a decorative screen configuration for fastening on a motor vehicle body is provided, which comprises a first and a second decorative screen section. The first decorative screen section has a bent shape and can preferably be situated in the transition area of C column and an upper boundary of a window shaft of the vehicle body. The window shaft boundary represents a lower boundary of a window opening implemented in the vehicle body. The second decorative screen section of the decorative screen configuration functions as an elongation of the first decorative screen section and comes to rest on or along the window shaft boundary in the final installation position of the decorative screen configuration.

The two decorative screen sections of this decorative screen configuration are preferably integrally connected to one another. For this purpose, both decorative screen sections may be equipped with a carrier manufactured from plastic, for example. The first and the second decorative screen sections can also both be fastenable separately on the vehicle body.

In this embodiment, however, at least one detent element is advantageously provided in the area of the first decorative screen section facing toward the vehicle body, which is implemented to work together with a counter detent element situated on the body side to fix the entire decorative screen in a pre-installation position on the vehicle body. The decorative screen comprising the first and second decorative screen sections is held so it is pivotable on the vehicle body around a rotational axis essentially coincident with the detent element or with the counter detent element for the transfer into the final installation position.

A positive connection of the decorative screen to the vehicle body can be produced using the detent and counter detent elements corresponding to one another, in which the decorative screen is held so it is pivotable on the vehicle body at least slightly around a rotational axis preferably running in the vehicle transverse direction. In the course of a corresponding pivot movement, the decorative screen can finally be transferred into a final installation position on the vehicle body. The entire installation process can be simplified in this manner, because the entire decorative screen is fixed on the vehicle body at least in regard to one degree of movement freedom, preferably in regard to two degrees of movement freedom, upon reaching its pre-installation position.

According to an advantageous refinement, the detent element and the counter detent element have a profile-type extension along the vehicle vertical axis (z), so that the decorative screen situated in the pre-installation position on the vehicle body is displaceable in relation to the vehicle body in the direction of the vehicle vertical axis. The detent element preferably solely provides fixing of decorative screen and vehicle body acting in the vehicle transverse direction (y) and vehicle longitudinal direction (x).

According to a further independent aspect, the invention further relates to a method for installing a decorative screen or decorative screen configuration on a motor vehicle body, the decorative screen having a first and a second decorative screen section, or a first and second decorative screen profile, which are each fastenable on the vehicle body. The first decorative screen section or the first decorative screen profile has a curved shape and can be situated in the transition area of C column and an upper boundary of a window shaft of the vehicle body.

The second decorative screen section or the second decorative screen profile comes to rest in its final installation position on the vehicle body in elongation on the first decorative screen section or the first decorative screen profile at the window shaft boundary. The installation method is distinguished by the steps explained hereafter.

Firstly, the decorative screen or the decorative screen configuration is fastened on the vehicle body using a screen-side detent element and a body-side counter detent element in a pre-installation position pivoted by a predetermined angle in relation to the final installation position. The fastening is such that the decorative screen or the decorative screen configuration is fixed at least with respect to two degrees of movement freedom, preferably in the vehicle transverse direction (y) and the vehicle longitudinal direction (x), in relation to the vehicle body. In addition, the decorative screen or the decorative screen configuration is mounted so it is at least slightly pivotable in relation to the vehicle body upon reaching the pre-installation position, so that in a second installation step, the decorative screen is pivoted around a rotational axis essentially coincident with the detent or counter detent element for transfer into its final installation position on the vehicle body.

Upon or after reaching the final installation position, the first and second decorative screen sections, or the first and second decorative screen profiles, are fastened positively and/or nonpositively on the vehicle body, for example, in that the decorative screens or decorative screen sections are clipped onto a body-side retention web using a C-shaped profile or U-shaped profile optionally embedded in a carrier lying underneath.

The decorative screen configuration according to the invention can be implemented as a two-component decorative screen comprising a first decorative screen profile and a second decorative screen profile. In an alternative, for example, one-piece embodiment of a decorative screen having a decorative screen section comparable to the first and second decorative screen profiles, the decorative screen configuration additionally comprises a detent element and/or counter detent element for fastening the decorative screen on the vehicle body in a pre-installation position.

BRIEF DESCRIPTION OF THE DRAWINGS

The present invention will hereinafter be described in conjunction with the following drawing figures, wherein like numerals denote like elements, and.

DETAILED DESCRIPTION

The following detailed description is merely exemplary in nature and is not intended to limit application and uses. Furthermore, there is no intention to be bound by any theory presented in the preceding background or summary or the following detailed description.

Figure 1:
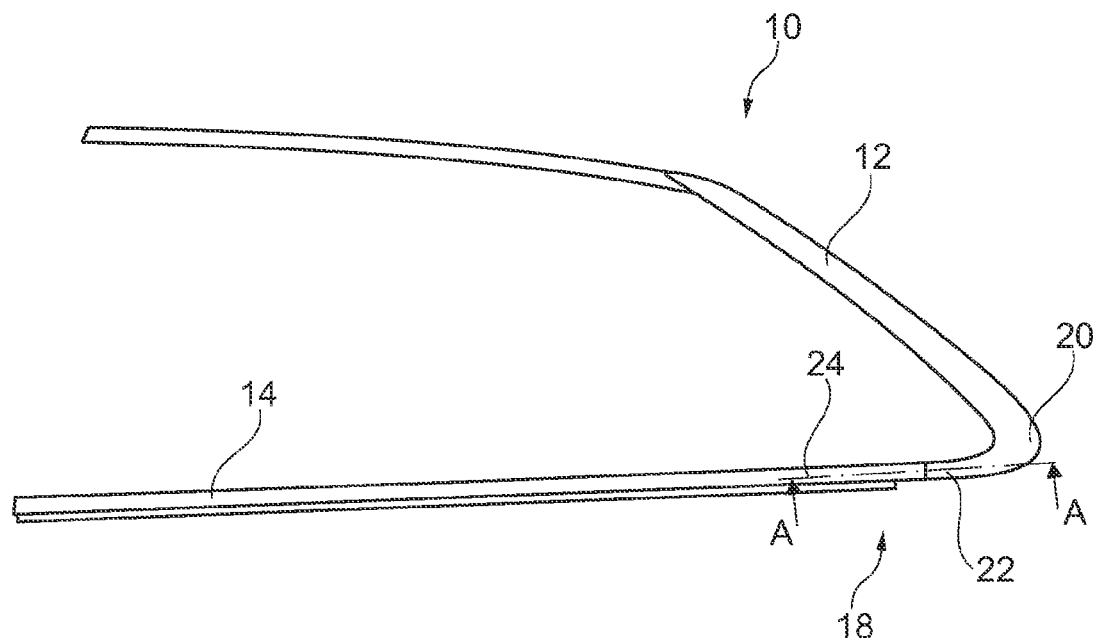
FIG. 1 shows a schematic illustration of a two-component decorative screen viewed from the exterior of the vehicle.
Figure 2:
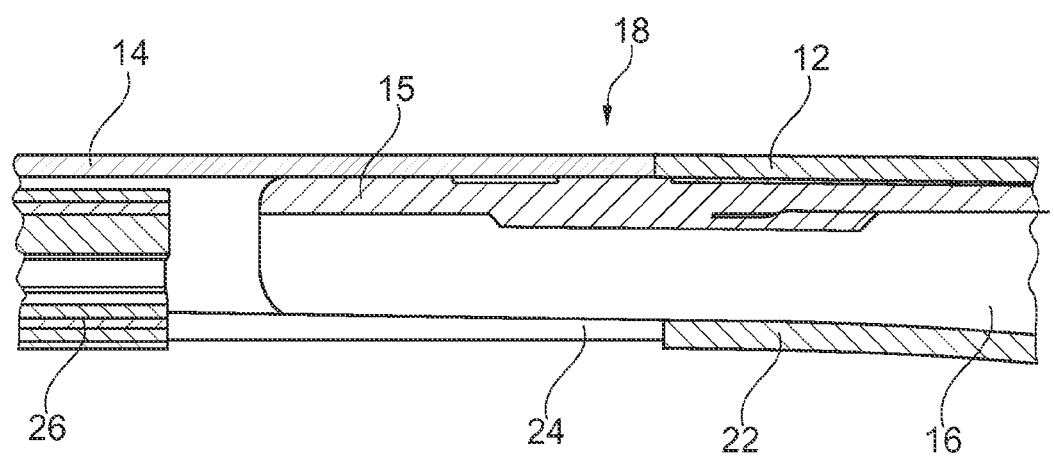
FIG. 2 shows an enlarged cross-sectional illustration of the transition area of first and second decorative screen profiles according to section line A-A from FIG. 1.
Figure 3:
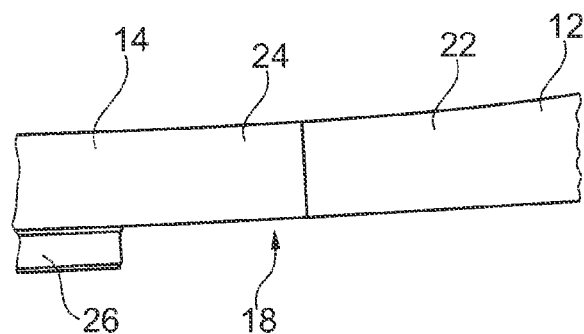
FIG. 3 shows an enlarged illustration of the abutting area of first and second decorative screen profiles according to FIG. 1 viewed externally.

The decorative screen 10 shown in FIG. 1 has a first decorative screen profile 12 and a second decorative screen profile 14, which are connectable to one another in an abutting area 18 using the end sections 22, 24 facing toward one another in a positive and/or nonpositive manner already before installation on a vehicle body 50 (schematically shown in FIG. 9) of a motor vehicle. While the second decorative screen profile 14 functions in the present case as a window shaft molding, the first decorative screen profile 12 has a comparatively strong curvature 20 in its area on the right in FIG. 1, which represents a curved transition, which is implemented as comparatively wide in cross-section, from a C column section of the vehicle body 50 to the window shaft section 51.

Because of this design of a window opening 54 and the decorative screen 10 at least regionally encompassing the window opening, it is necessary to produce the two decorative screen profiles 12, 14 in different ways. While the essentially linearly implemented window shaft molding 14 is preferably to be produced according to an extrusion method, the production of the first decorative screen profile 12 requires the use of a casting method, such as an aluminum die-casting method. Furthermore, roll shaping of a metal starting material would also be conceivable.

If one fastened the two decorative screen profiles 12, 14 separately and independently of one another on the vehicle body 50, a gap, an offset, or a play would result between the end sections 22, 24 of the two decorative screen profiles 12, 14 facing toward one another in the abutting area 18 because of manufacturing-related or installation-related tolerances. To prevent this, and to allow the simplest possible installation of the entire decorative screen 10 on the vehicle body 50, the two decorative screen profiles 12, 14, which abut one another in the profile longitudinal direction, are already connected to one another in the abutting area 18 using a fastening extension 15 before the installation on the vehicle body 50.

Figure 6:
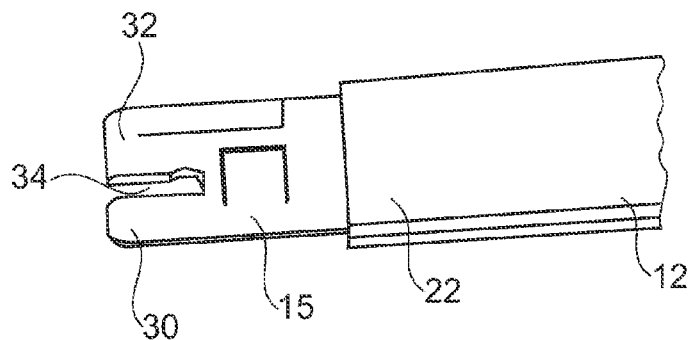
FIG. 6 shows a perspective illustration of the end section of the first decorative screen profile provided with a fastening extension.

In addition to its metal screen part 12, for example, the first decorative screen profile has a carrier 16, preferably manufactured from plastic, which is extruded on the metal screen part 12 or can be connected fixedly to the metal screen part 12 using an injection-molding process. The carrier 16 has a fastening extension 15 protruding from the end section 22 of the screen part 12, as shown in perspective in FIG. 6, which is distinguished by a slotted recess 34 and two at least slightly elastically flexible legs 30, 32.

Figure 4:
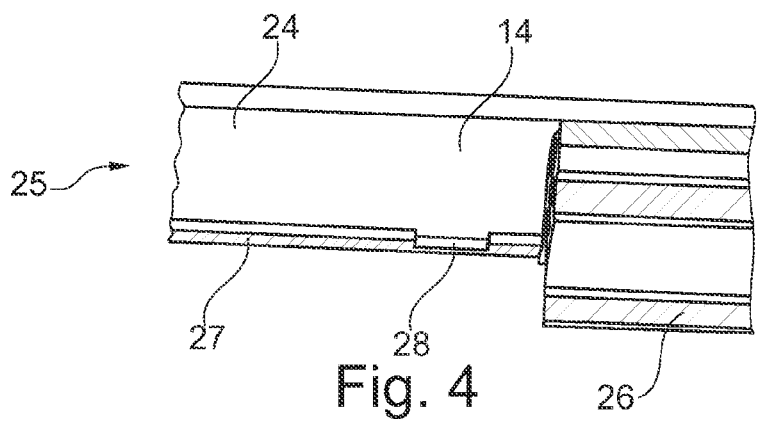
FIG. 4 shows a perspective illustration of the receptacle implemented on the second profile part viewed from the vehicle interior.
Figure 5:
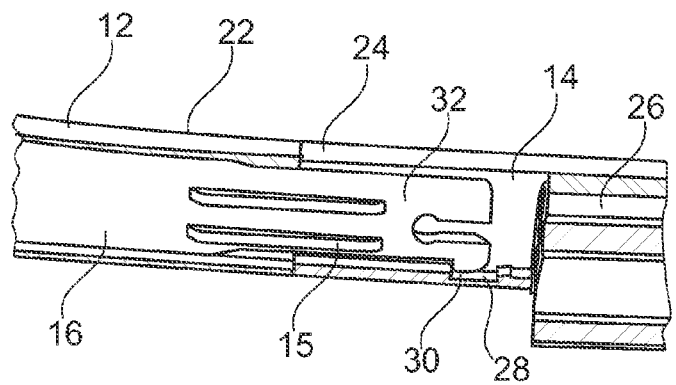
FIG. 5 shows the decorative screen profiles connected to one another viewed from the vehicle interior.

As illustrated in FIG. 5, the lower leg 30 of the fastening extension 15 therein has an outwardly directed detent lug facing away from the slot 34, which comes to rest in a recess 28 or a setback of a profile edge 27 of a corresponding receptacle 25 of the second decorative screen profile 14 to form a form fit of the two decorative screen profiles 12, 14, as is disclosed from consideration of FIG. 4 and FIG. 5 together.

The receptacle 25 of the second screen profile 14 is essentially determined by the shaping of the preferably metal decorative screen profile. The profile 14 can be implemented as C-shaped or U-shaped in cross-section and can have two lateral edge sections 27 adjoining the vehicle body 50, as illustrated in FIG. 4. Furthermore, a retention or fastening molding 26 is indicated in FIG. 4 and FIG. 5, using which the decorative screen profile 14 is positively fastenable on the vehicle body 50, in particular if the retention or fastening molding 26 is already situated on the vehicle body 50 before installation of the decorative screen 10. For example, the decorative screen profile 14 can have a C-shaped or U-shaped receptacle for a clamp seat with the retention or fastening molding 26 in the area of the retention molding 26 on the inside, i.e., facing toward the molding 26.

Figure 7:
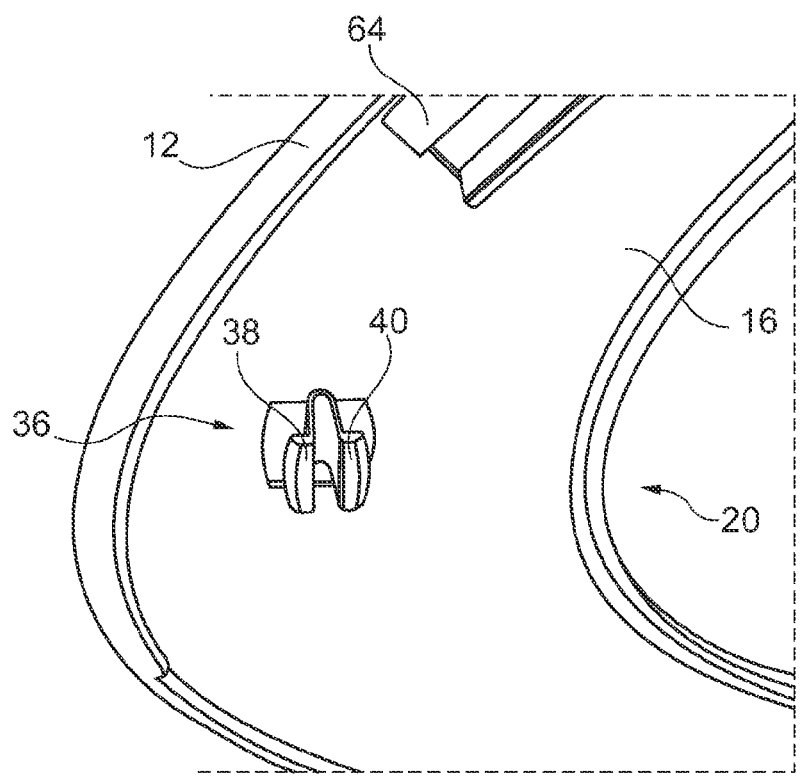
FIG. 7 shows a perspective illustration of a detent element provided on the decorative screen profile side.

The first decorative screen profile 12 is also provided on the carrier side 16, facing toward the vehicle body, with a fastening profile 64, as shown in detail in FIG. 7. Using this fastening profile 64, which has two opposing webs, the first decorative screen profile 12 is fastenable via its carrier on the vehicle body, for example, on a C column section 53 of a vehicle door 50 shown in FIG. 9.

In addition to the positive connection of the two decorative screen profiles 12, 14 shown in FIG. 1 through FIG. 6, a supporting or exclusively glued connection of the two profiles 12, 14 can also be implemented via the fastening extension 15, for example, in that the fastening extension 15 or the receptacle 25 corresponding thereto is provided with an adhesive or with an adhesive layer. It is also conceivable to first supply a corresponding adhesive after the joining of the two decorative screen profiles 12, 14.

Using the plug connection of the two decorative screen profiles 12, 14 shown in FIG. 1 through FIG. 6, a transition without gap, play, or offset can be provided in the abutting area 18. In particular, decorative screen profiles 12, 14 produced in different ways may thus be connected to one another before their final installation on the vehicle body 50, so that the final installation effort at the automobile manufacturer can be advantageously reduced.

For the final mounting of the decorative screen 10, a detent element 36 is implemented on the first decorative screen profile 12, or on its carrier 16, as illustrated in FIG. 7. The detent element 36, which is implemented as an oval or rectangular clip and has two legs 38, 40, which are movable toward one another and run essentially parallel to one another, is integrally molded on the carrier 16.

Figure 8:
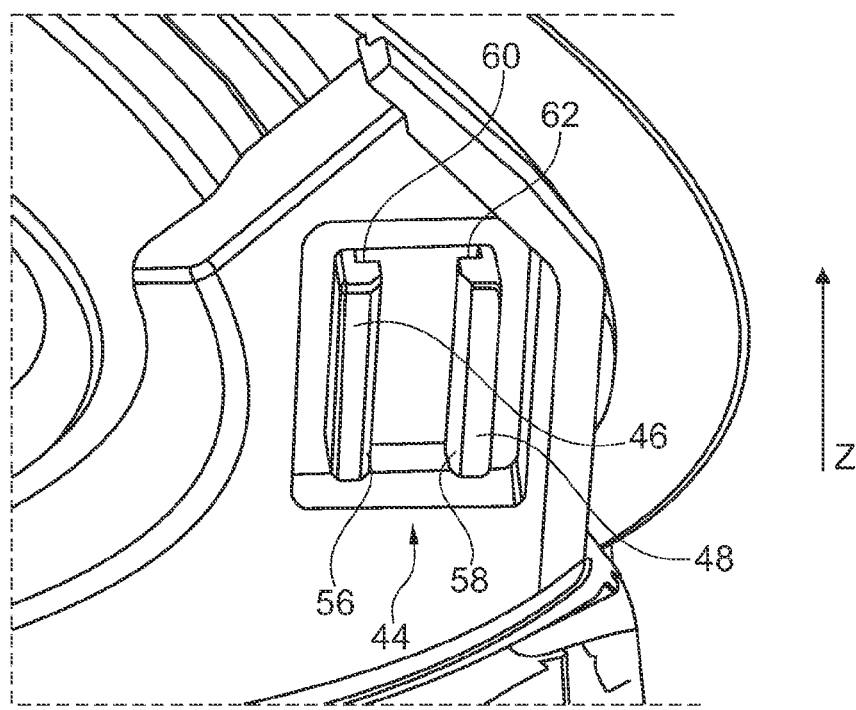
FIG. 8 shows a perspective illustration of the counter detent element situated on the body side, which corresponds to the detent element from FIG. 7.

The clip 36 is implemented for the purpose of being clipped into a counter detent element 44 (shown in FIG. 8), which is situated on the body side. The counter detent element 44 represents a receptacle for the detent clip 36 and has two retention webs 46, 48, which run essentially in the vehicle vertical axis (z) and are spaced apart from one another. Each of these retention webs 46, 48 has an insertion bevel 56, 58 on the edge facing toward the particular other web 48, 46, which works together with corresponding insertion bevels of the clip 36 or its legs 38, 40 upon insertion of the clip 36 into the receptacle 44.

The clip-side legs 38, 40 and also the retention webs 46, 48 have undercuts 60, 62 implemented like a detent lug, which rest on one another upon reaching the final installation position of the decorative screen 10 on the vehicle body 50 and thus prevent independent detachment of the decorative screen 10 from the vehicle body 50.

The retention webs 46, 48 situated on the body side extend running parallel in the z direction, i.e., essentially along the vehicle vertical axis. In this way, it is made possible in particular that the decorative screen 10 preinstalled on the vehicle body 50 is retained so it is displaceable on the vehicle body 50 within certain limits at least in the z direction. Furthermore, the geometrical implementation of the fastening clip 36 allows at least slight pivoting of the carrier 16, the decorative screen profile 12 connected thereto, and finally the entire decorative screen 10 preinstalled on the vehicle body 50. This pivoting capability, which allows a pivot angle of up to approximately 8°, 10°, or even more, is caused by the shaping and the flexible implementation of the fastening clip 36. A maximum pivot angle can be intentionally set by the geometrical implementation and the selection of a suitable material which is elastically deformable at least in certain limits.

Figure 9:
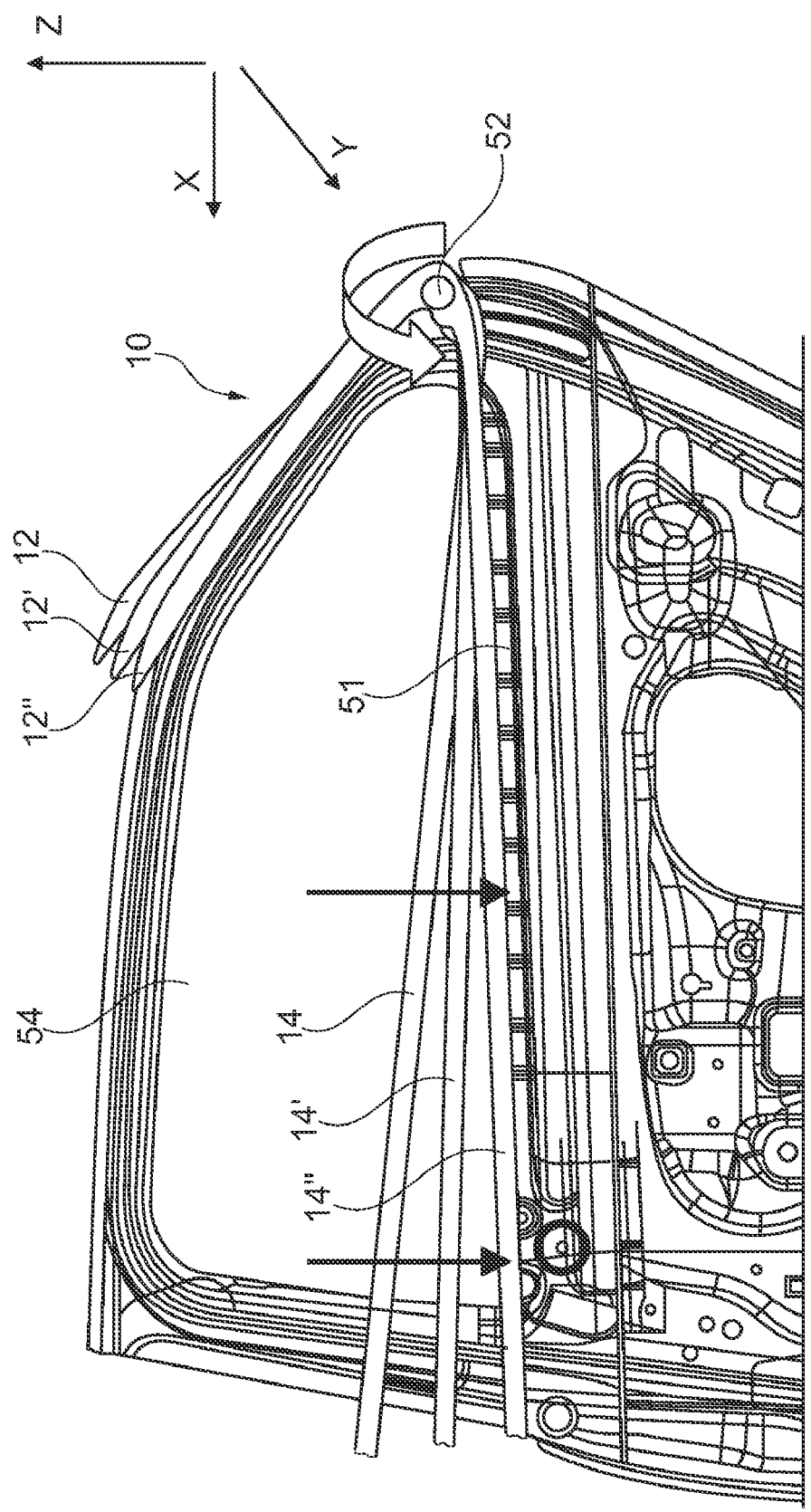
FIG. 9 shows a step-by-step transfer of the preconfigured decorative screen from its pre-installation position into the final installation position on the vehicle body.

The installation of a preconfigured decorative screen 10 on the vehicle body 50 of the vehicle is illustrated in three sequential configurations in FIG. 9. Using the detent and counter detent elements 36, 44, which correspond to one another, the decorative screen 10 is fixed in a first mounting step on the vehicle body 50 at least in regard to the x and y directions. In this pre-installation position achievable in this way, it is provided that the two decorative screen profiles 12, 14 connected to one another are fastened on the vehicle body 50 in a position pivoted clockwise relative to the final installation position, for example.

This is followed by a pivot movement of the entire decorative screen configuration directed counterclockwise around a rotational axis 52, the first decorative screen profile 12 merging into a first pivot position 12' and subsequently into a pivot position 12" corresponding to the final installation position. Because the two decorative screen profiles 12, 14 are connected to one another in the way shown in FIG. 1 through FIG. 6, the second decorative screen profile 14, which functions as a window shaft molding, executes a corresponding pivot movement passing over the intermediate position 14' until it comes to rest in the final installation position 14" on the vehicle body, in particular on the window shaft boundary 51.

The fastening of the entire decorative screen 10 on the vehicle body 50 only requires a movement of the decorative screen composite 12, 14 on the vehicle body 50 which is directed in the vehicle transverse direction and is pivoted by approximately 10° clockwise to the final installation position. The clip 36 and the receptacle 44 engage acoustically perceptibly and thus give feedback to an installer that the pre-installation position has been reached.

Separate fastening of both decorative screen profiles, or decorative screen profile sections 12, 14, is performed using detent moldings 64 provided for this purpose on the inner side of the decorative screen profiles 12, 14 or on the inner side of the carrier 16. Possible tolerances from the components or installation are compensated for on the B column side after fastening of the decorative screen 10 on the vehicle body 50.

The present exemplary embodiments illustrated on the basis of FIG. 1 through FIG. 9 show a decorative screen configuration 10 having at least two decorative screen profiles 12, 14, which are joined before installation on the vehicle body 50.

An alternative embodiment is also within the scope of the invention, in which the entire decorative screen 10 shown in FIG. 1 and FIG. 9, for example, is implemented in one piece, for example, as an injection-molded part, so that the corresponding decorative screen profile sections 12, 14 are already fixedly connected to one another in the course of a production process.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A decorative screen configuration for fastening on a motor vehicle body, comprising:
   a first decorative screen profile that is fastenable on the motor vehicle body with a first end section;
   a second decorative screen profile that is fastenable on the motor vehicle body using a second end section and adjoining the first decorative screen profile in a profile longitudinal direction;
   a fastening extension of the first decorative screen profile protruding in the profile longitudinal direction from the first end section that is connectable to the second end section of the second decorative screen profile wherein the fastening extension is an integral component of a carrier connected to the first decorative screen profile, and wherein the carrier is formed at least partially from a plastic and connected using an injection-molding process to the first decorative screen profile that is at least partially formed from a metal.

2. The decorative screen configuration according to claim 1, wherein the second decorative screen profile comprises a receptacle adapted for the fastening extension implemented as a C-shaped in cross-section, and laterally encloses the fastening extension in an installation position.

3. The decorative screen configuration according to claim 1, wherein the second decorative screen profile comprises a receptacle adapted for the fastening extension implemented as a U-shaped in cross-section, and laterally encloses the fastening extension in an installation position.

4. The decorative screen configuration according to claim 1, wherein the second decorative screen profile comprises at least one recess for a detent element implemented on the fastening extension on the second end section adapted to receive the fastening extension of the first decorative screen profile facing toward the motor vehicle body in a final installation position.

5. A decorative screen configuration for fastening on a motor vehicle body, comprising:
   a first decorative screen profile that is fastenable on the motor vehicle body with a first end section;
   a second decorative screen profile that is fastenable on the motor vehicle body using a second end section and adjoining the first decorative screen profile in a profile longitudinal direction; and
   a fastening extension of the first decorative screen profile protruding in the profile longitudinal direction from the first end section that is connectable to the second end section of the second decorative screen profile;

wherein the second decorative screen profile comprises at least one recess for a detent element implemented on the fastening extension on the second end section adapted to receive the fastening extension of the first decorative screen profile facing toward the motor vehicle body in a final installation position, and wherein the detent element is a detent lug that is flexibly deformable transversely to a profile longitudinal extension and rests in a recess implemented on an edge of the second decorative screen profile in the final installation position.

6. A decorative screen configuration for fastening on a motor vehicle body, comprising:
a first decorative screen profile that is fastenable on the motor vehicle body with a first end section;
a second decorative screen profile that is fastenable on the motor vehicle body using a second end section and adjoining the first decorative screen profile in a profile longitudinal direction; and
a fastening extension of the first decorative screen profile protruding in the profile longitudinal direction from the first end section that is connectable to the second end section of the second decorative screen profile wherein the fastening extension is glued to a receptacle on the second decorative screen profile for a no positive fastening of the first decorative screen profile to the second decorative screen profile.

7. The decorative screen configuration according to claim 6, wherein the fastening extension is an integral component of a carrier connected to the first decorative screen profile.

8. The decorative screen configuration according to claim 7, wherein the carrier is formed at least partially from a plastic and connected using an injection-molding process to the first decorative screen profile that is at least partially formed from a metal.

9. The decorative screen configuration according to claim 1, wherein a detent element is adapted to form a detent connection with a counter detent element situated on a body side on a side of the carrier of the first decorative screen profile facing toward the motor vehicle body, the detent connection implemented to fix the carrier on the motor vehicle body at least in relation to a vehicle horizontal direction and allow a compensation movement of the carrier relative to the motor vehicle body essentially along a vehicle vertical direction (z).

10. A decorative screen configuration for fastening on a motor vehicle body, comprising:
a first decorative screen profile that is fastenable on the motor vehicle body with a first end section;
a second decorative screen profile that is fastenable on the motor vehicle body using a second end section and adjoining the first decorative screen profile in a profile longitudinal direction;
a fastening extension of the first decorative screen profile protruding in the profile longitudinal direction from the first end section that is connectable to the second end section of the second decorative screen profile;
wherein the fastening extension is an integral component of a carrier connected to the first decorative screen profile, wherein a detent element is adapted to form a detent connection with a counter detent element situated on a body side on a side of the carrier of the first decorative screen profile facing toward the motor vehicle body, the detent connection implemented to fix the carrier on the motor vehicle body at least in relation to a vehicle horizontal direction and allow a compensation movement of the carrier relative to the motor vehicle body essentially along a vehicle vertical direction (z), and wherein the carrier is linked on the motor vehicle body and pivotable by at least approximately 10° using the detent connection formed by the detent element in the counter detent element.

11. The decorative screen configuration according to claim 9, wherein the detent element is a clip comprising at least two elastically deformable legs adapted to clip into the counter detent element and provided with retention webs oriented essentially parallel to one another.

12. The decorative screen configuration according to claim 9, wherein the detent element and the counter detent element each comprise an insertion bevel corresponding to one another.

13. The decorative screen configuration according to claim 1, wherein the first decorative screen profile comprises a bent shape and is situated in a transition area of a C column and an upper window shaft boundary of the motor vehicle body.

14. A decorative screen configuration for fastening on a motor vehicle body including a decorative screen, comprising:
a first decorative screen section having a bent shape and configured for a transition area of a C column and an upper boundary of a window shaft of the motor vehicle body that delimits a window opening on a bottom;
a second decorative screen section coming to rest in a final installation position in elongation to the first decorative screen section at the upper boundary;
at least one detent element of the first decorative screen section facing toward the motor vehicle body;
a counter detent element situated on a body side that cooperates with the at least one detent element to fix the decorative screen in a pre-installation position on the motor vehicle body in which the decorative screen is retained and pivotable on the motor vehicle body around a rotational axis essentially coincident with at least one of the at least one detent element or the counter detent element for transfer into the final installation position.

15. The decorative screen configuration according to claim 14, wherein the at least one detent element or the counter detent element have a profiled extension along a vehicle vertical axis (z) so that the decorative screen situated in the pre-installation position on the motor vehicle body is displaceable essentially in a direction of the vehicle vertical axis (z) in relation to the motor vehicle body.

16. A method for installing a decorative screen on a motor vehicle body, the decorative screen comprising a first decorative screen section and a second decorative screen section that are each fastenable on the motor vehicle body, the first decorative screen section comprising a bent shape and adapted for a transition area of a C column and an upper boundary of a window shaft of the motor vehicle body that delimits a window opening on a bottom, and the second decorative screen section coming to rest in elongation to the first decorative screen section at the upper boundary in a final installation position on the motor vehicle body, comprising:
fixing the decorative screen in a pre-installation position on the motor vehicle body that is pivoted by a predetermined angle in relation to the final installation position using a screen-side detent element and a body-side counter detent element;
pivoting the decorative screen into the final installation position around a rotational axis that is essentially coincident with at least one of the detent element or a counter detent element;

fastening of the first decorative screen section and the second decorative screen section on the motor vehicle body.

17. The decorative screen configuration according to claim 10, wherein the carrier is formed at least partially from a plastic and connected using an injection-molding process to the first decorative screen profile that is at least partially formed from a metal.

18. The decorative screen configuration according to claim 7, wherein the fastening extension is an integral component of a carrier connected to the first decorative screen profile, and wherein the carrier is formed at least partially from a plastic and connected using an injection-molding process to the first decorative screen profile that is at least partially formed from a metal.

19. The decorative screen configuration according to claim 7, wherein the fastening extension is glued to a receptacle on the second decorative screen profile for a no positive fastening of the first decorative screen profile to the second decorative screen profile.

20. The decorative screen configuration according to claim 10, wherein the fastening extension is glued to a receptacle on the second decorative screen profile for a no positive fastening of the first decorative screen profile to the second decorative screen profile.

* * * * *